(12) United States Patent
Everson

(10) Patent No.: US 7,632,408 B1
(45) Date of Patent: Dec. 15, 2009

(54) PASSIVE DRAIN FIELD SYSTEM FOR WASTEWATER TREATMENT AND ASSOCIATED METHODS

(75) Inventor: Douglas G. Everson, Tavares, FL (US)

(73) Assignee: Plastic Tubing Industries, Inc., Apopka, FL (US)

( * ) Notice: Subject to any disclaimer, the term of this patent is extended or adjusted under 35 U.S.C. 154(b) by 22 days.

(21) Appl. No.: 12/147,722

(22) Filed: Jun. 27, 2008

Related U.S. Application Data

(60) Provisional application No. 60/947,060, filed on Jun. 29, 2007.

(51) Int. Cl.
C02F 3/30 (2006.01)

(52) U.S. Cl. .................. 210/605; 210/615; 210/617; 210/630; 210/747; 210/151; 210/170.08; 210/903; 405/43; 405/45; 405/50

(58) Field of Classification Search ........... 210/605, 210/615, 617, 630, 747, 150, 151, 170.08, 210/532.2, 903; 405/36, 43, 45, 46, 50
See application file for complete search history.

(56) References Cited

U.S. PATENT DOCUMENTS

| | | | |
|---|---|---|---|
| 848,279 A * | 3/1907 | Ashley | 210/170.08 |
| 2,366,522 A | 1/1945 | Gutman | |
| 3,060,693 A | 10/1962 | Taylor | |
| 3,403,519 A | 10/1968 | Balko | |
| 3,441,140 A | 4/1969 | Thurber | |
| 3,698,195 A | 10/1972 | Chapin | |
| 4,019,326 A | 4/1977 | Herveling et al. | |
| 4,134,268 A | 1/1979 | Elmore | |
| 4,188,154 A | 2/1980 | Izatt | |
| 4,246,305 A | 1/1981 | Delattre | |
| 4,465,594 A * | 8/1984 | Laak | 210/170.08 |
| 4,588,325 A | 5/1986 | Seefert | |
| 4,799,822 A | 1/1989 | Wintermantel et al. | |
| 4,824,287 A | 4/1989 | Tracy | |
| 4,904,112 A | 2/1990 | McDonald | |
| 4,907,385 A | 3/1990 | Biodrowski | |

(Continued)

FOREIGN PATENT DOCUMENTS

GB    2040151    8/1980

(Continued)

*Primary Examiner*—Christopher Upton
(74) *Attorney, Agent, or Firm*—Allen Dyer Doppelt Milbrath & Gilchrist

(57) ABSTRACT

A passive drain field assembly reduces nitrogen in wastewater by facilitating nitrification and denitrification. A first chamber receives effluent into a multi-pipe bundle. An air vent is provided that extends from the atmosphere into the first chamber. A second chamber receives effluent from the first chamber, and contains a medium, beneath which is positioned a drainage pipe for releasing treated effluent into the soil therebeneath. A berm creates a retention area in the second chamber that is lined with a water-impermeable liner. In use, ammonia present in the effluent is converted to nitrate in the presence of the oxygen admitted by the air vent in the first chamber. The liquid retained upstream of the berm and above the liner undergoes anaerobic reactions. The remaining liquid proceeds to a place in the second chamber from which the drainage pipe can be entered, from which the treated wastewater can enter the soil.

12 Claims, 1 Drawing Sheet

U.S. PATENT DOCUMENTS

| | | |
|---|---|---|
| 4,950,103 A | 8/1990 | Justice |
| 5,015,123 A | 5/1991 | Houck et al. |
| 5,074,708 A | 12/1991 | McCann, Sr. |
| 5,087,151 A | 2/1992 | DiTullio |
| 5,318,699 A * | 6/1994 | Robertson et al. ........... 210/151 |
| 5,378,357 A | 1/1995 | Houck et al. |
| 5,516,229 A | 5/1996 | Atchley et al. |
| 5,520,481 A | 5/1996 | Atchley et al. |
| 5,951,866 A * | 9/1999 | Grove et al. ........... 210/170.08 |
| 6,428,691 B1 * | 8/2002 | Wofford ..................... 210/151 |
| 6,540,910 B2 * | 4/2003 | Schwarzenegger et al. .. 210/151 |
| 7,081,203 B2 * | 7/2006 | Helm ......................... 210/617 |
| 7,144,509 B2 * | 12/2006 | Boyd et al. ................. 210/605 |
| 7,510,649 B1 * | 3/2009 | Lavigne ..................... 210/151 |
| 2003/0070971 A1 * | 4/2003 | Kim ........................... 210/170 |
| 2004/0112809 A1 * | 6/2004 | Hassett ....................... 210/150 |
| 2004/0253054 A1 * | 12/2004 | Atchley ...................... 405/36 |

FOREIGN PATENT DOCUMENTS

| | | |
|---|---|---|
| SU | 1069720 | 1/1984 |
| SU | 1442605 | 7/1988 |

\* cited by examiner

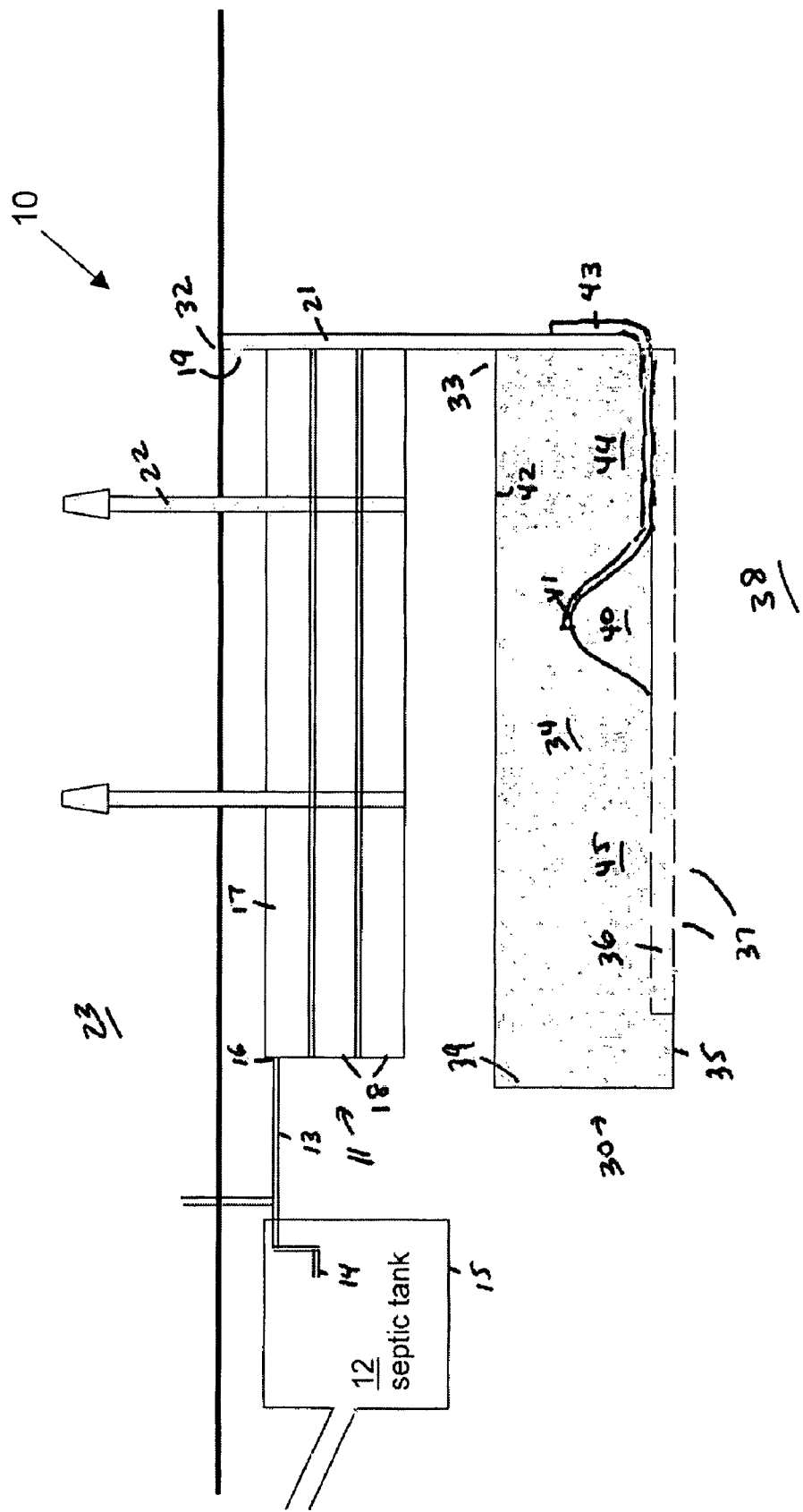
THE FIGURE

PASSIVE DRAIN FIELD SYSTEM FOR WASTEWATER TREATMENT AND ASSOCIATED METHODS

CROSS-REFERENCE TO RELATED APPLICATION

This application claims priority to provisional patent application Ser. No. 60/947,060, filed Jun. 29, 2007.

BACKGROUND OF THE INVENTION

1. Field of the Invention

The present invention relates to wastewater treatment systems and, more particularly, to an improved drain field system that can operate passively.

2. Description of Related Art

Traditional sewage systems, such as those used for disposing waste from homes that are not connected to sewer lines, typically comprise a concrete, plastic, or steel septic tank into which both solid and liquid waste flow. The tank has one or more compartments through which the sewage flows horizontally and is kept out of contact with the air for a minimum of 24 hours. Spontaneous biological action liquefies much of the organic matter, while fine particles settle to the bottom, where bacteria convert some of the organic matter into methane and carbon dioxide. The solid matter either decomposes or is periodically pumped out of the tank.

The liquid flows out of the septic tank through a perforated pipe surrounded by loose aggregate, usually a bed of rock or gravel. The soil itself then continues the filtering process, and the liquid ultimately returns to the ground water.

The installation of such sewage systems entails digging a trench or bed into which is poured aggregate in the form of rock, crushed stone, or gravel. The perforated pipe is then laid down on the aggregate, and additional aggregate is added to a required depth. The top layer consists of soil cover, preferably planted, to facilitate surface water runoff.

Conventional systems require a considerable amount of skilled labor and expensive materials. The installations must meet stringent state and local codes, and must often take place in difficult terrain. For instance, suitable fill material is often difficult to obtain, since the aggregate must meet size and cleanliness requirements.

An additional problem with currently used systems is that the aggregate material, being of nonuniform sizes, has variable properties with regard to retention and evenness of distribution. Fines associated with the aggregate are capable of sealing off with sewage material, which prevents further filtration at such sealed off sites.

Another problem with conventional systems is that the depth of aggregate is 12 in., and with a typical 24-in. water table separation, the drainfield is 36 in. plus the cover, making many sites unbuildable or resulting in expensive upgrades.

The assignee of the present invention has also disclosed in U.S. Pat. Nos. 5,516,229 and 5,520,481 the use of assemblies of stacked void and distribution pipes in a plurality of configurations for use without aggregate. The disclosure of these patents is incorporated hereinto by reference.

SUMMARY OF THE INVENTION

The passive drain field assembly disclosed herein achieves a reduction of nitrogen in wastewater effluent by facilitation of nitrification and denitrification processes, resulting in the conversion of ammonia into nitrate, and thence the conversion of nitrate to nitrogen gas. The passive drain field assembly comprises a first chamber in fluid communication with an effluent source, for example, a septic tank, although this is not intended as a limitation. The first chamber contains a substantially horizontal multi-pipe bundle, such as, but not intended to be limited to, those disclosed in the above-referenced '229 and '481 patents. For example, the multi-pipe bundle can include a distribution pipe positioned atop a plurality of void pipes, each having holes therethrough for receiving and permitting the drainage over time of effluent. One or more air vents are provided that extends from the atmosphere into the first chamber, providing a vehicle for exchanging oxygen with the ammonia, and promoting nitrification.

The passive drain field assembly further comprises a second chamber in fluid communication with the first chamber, for receiving effluent therefrom. The second chamber contains a reactive medium that can act as a carbon source. In some embodiments, beneath the reactive medium, adjacent the bottom of the second chamber, is positioned a drainage pipe having a plurality of apertures therein for releasing treated effluent into the soil therebeneath. If present, this drainage pipe opens up the infiltrative surface area under the berm.

Above the drainage pipe, and between an upstream end and a downstream end, is positioned a berm, or raised portion, extending above a bottom of the second chamber and with a top in spaced relation from a top of the second chamber. Positioned atop the berm, and extending to the upstream end of the second chamber, is a water-impermeable or semi-permeable liner, which terminates upstream of the second chamber's downstream end.

In use, the passive drain field assembly receives effluent from the wastewater source, such as a septic tank, which drains into the first chamber. Ammonia present in the effluent is converted to nitrate in the presence of the oxygen, a conversion accelerated by the air vent.

The liquid then flows into the second chamber, where at least some of it is retained upstream of the berm and above the liner. During the residence time in the second chamber, anaerobic reactions occur, and the nitrate is converted to nitrogen gas. The remaining liquid flows over the berm to a place in the second chamber, where it passes through soil and/or reactive media. A drainage pipe placed in this area and passing under the berm opens up the infiltrative area that is blocked by the barrier.

The features that characterize the invention, both as to organization and method of operation, together with further objects and advantages thereof, will be better understood from the following description used in conjunction with the accompanying drawing. It is to be expressly understood that the drawing is for the purpose of illustration and description and are not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWING

THE FIGURE is a cross-sectional view of the passive drain field assembly of the present invention.

DETAILED DESCRIPTION OF THE PREFERRED EMBODIMENTS

A description of the preferred embodiments of the present invention will now be presented with reference to THE FIGURE.

The passive drain field assembly 10 of the present invention, which is designed to reduce nitrogen in wastewater effluent by facilitation of nitrification and denitrification processes, comprises a first, substantially horizontal, chamber 11 in fluid communication with an effluent source, for example, a septic tank 12, although this is not intended as a limitation. The first chamber 11 can receive the influent by means of a pipe 13 having an inlet 14 positioned in spaced relation from a bottom 15 of the septic tank 12. The outlet 16 of the pipe channels effluent to a distribution pipe 17 positioned atop a plurality of void pipes 18 such as previously disclosed. The distribution 17 and void 18 pipes, which are sloped downwardly in a downstream direction, retain the effluent for a time, until the effluent level therein reaches the level of the apertures therethrough. Effluent reaching a level 19 in spaced relation from the bottom 20 of the distribution pipe 17 then can exit into a vertical pipe 21.

The first chamber 11 further includes a plurality of air vents 22 that extend from the external atmosphere 23 into the first chamber 11.

The passive drain field assembly 10 further comprises a second chamber 30 that is in fluid communication with the first chamber 11, for receiving effluent therefrom. In a particular embodiment, the substantially vertical pipe 21 extends from a downstream end 32 of the first chamber 11 to an upstream end 33 of the second chamber 30, which here is shown as being positioned directly beneath the first chamber 11, although this is not intended as a limitation.

The second chamber 30 contains a reactive medium 34 that can act as a carbon source. The medium 34 can comprise, for example, a reactive porous medium such as, but not intended to be limited to, a recycled vehicle tire material. Beneath the reactive medium 34, adjacent the bottom 35 of the second chamber 30, is positioned a drainage pipe 36 that has a plurality of apertures 37 therein for releasing treated effluent into the soil 38 therebeneath. Typically the drainage pipe 36 slopes downwardly toward the upstream end 33 of the second chamber 30.

Above the drainage pipe 38, and between the upstream end 33 and a downstream end 39, is positioned a berm 40, or raised portion, extending above the bottom 35 of the second chamber 30. The berm 40 can be positioned adjacent a middle of the second chamber 30, although this is not intended as a limitation. The berm 40 has a top 41 that is in spaced relation from a top 42 of the second chamber 40. Positioned atop the berm 40, and extending to the upstream end 33 of the second chamber 30, is a water-impermeable or semi-permeable liner 43, which terminates upstream of the second chamber's downstream end 39, and, here, terminates just over the crest 41 of the berm 40.

In use, the passive drain field assembly 10 receives effluent from the wastewater source 12, which drains into the first chamber 11. Ammonia present in the effluent is converted to nitrate in the presence of the oxygen admitted by the air vents 22. In some embodiments, a wind-driven turbine can be used to enhance the process of moving oxygen through the soil.

The liquid then flows into the second chamber 30, where at least some of it is retained upstream of the berm 40 and above the liner 43. During the residence time in the second chamber 30, the retention area 44 can remain partially saturated and anaerobic, permitting denitrification to occur while the retained fluid is in contact with the medium 34. The denitrified effluent then flows over the berm 40 into a partially saturated front section 45 of the second chamber 30.

When fluid flow is low, the effluent may proceed directly from the distribution pipe 17 to the vertical pipe 21; in periods of high flow, the effluent can proceed into the void pipes 18, from whence it can enter the media 34 directly below it. Under these conditions the medium 34 in the front section 45 is usually saturated, and conversion of nitrate can occur.

From the front section 45 of the second chamber 30, the effluent trickles into the drainage pipe 38 and then into an infiltrative surface area that can be dimensioned according to the loading requirements of the soil. The liner 43 serves to reduce the infiltrative area, but the drainage pipe 38 can extend the infiltrative surface area throughout the entire footprint of the system 10.

The present system 10 is believed to have a plurality of important features, among which is the use of vented and/or aerated multi-pipe or chambers in the nitrification layer to substantially increase the efficiency of the aerobic bacteria essential in this zone for facilitating nitrification. The establishment of the retention zone provides contact with the medium facilitates an anaerobic environment. A "bubble" is created by the berm and liner that provides this retention zone. The sloping of the pipes permits a delivery of the effluent into the retention area. The positioning of drainage pipes within the medium and sloping them through the berm to the area under the retention area makes accessible the infiltrative surface thereunder. This allows the system to be installed in areas that are designed to accommodate a conventional drain field.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system illustrated and described herein are by way of example, and the scope of the invention is not limited to the exact details of construction and use.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A passive drain field assembly comprising:
   a first chamber placeable in fluid communication with an effluent source of wastewater at an inlet and comprising:
   a subterranean bundle of pipes comprising a distribution pipe in fluid communication with the inlet, the distribution pipe having a plurality of apertures therethrough and a plurality of void pipes positioned lower than the distribution pipe, the void pipes each having a plurality of apertures therein, the pipe bundle slightly sloping toward an outlet; and
   a vent extending from an interior of the first chamber to an atmosphere above the pipe bundle;
   a second chamber having an inlet in fluid communication with the pipe bundle outlet positioned at least partially beneath the first chamber and having a perforated bottom, the second chamber comprising:
   a reactive carbon-source medium positioned within an inner space of the second chamber;
   an elevated berm positioned in spaced relation from the second chamber inlet and a downstream end, and having a top in spaced relation from a top of the second chamber;
   a liquid-impermeable barrier sheet positioned along the second chamber bottom and extending from the inlet to at least the berm top; wherein, in use:

effluent is channeled into the first chamber inlet, into the distribution pipe, and into the void pipes, wherein the effluent resides, ammonia in the effluent at least partially converted to a nitrate in the presence of oxygen supplied via the vent;

effluent rising above the distribution pipe apertures exits via the first chamber outlet to the second chamber inlet;

effluent remains in a retention portion of the second chamber upstream of the berm until the effluent reaches a level higher than the berm top, wherein the nitrate is converted to nitrogen gas and is placed in contact with the reactive medium; and effluent flowing over the berm top to a portion of the second chamber downstream of the berm continues to contact the reactive medium and can seep into soil beneath the second chamber through the perforated bottom.

2. The passive drain field assembly recited in claim 1, wherein the effluent source of wastewater comprises a septic tank having an outlet in spaced relation from a bottom of the septic tank, the septic tank outlet in fluid communication with the first chamber inlet.

3. The passive drain field assembly recited in claim 1, further comprising a substantially vertical pipe for providing fluid communication between the pipe bundle outlet and the second chamber inlet.

4. The passive drain field assembly recited in claim 1, wherein the reactive carbon-source medium comprises recycled vehicle tire material.

5. The passive drain field assembly recited in claim 1, wherein the second chamber bottom comprises a second distribution pipe, the second distribution pipe having a plurality of apertures therethough, the barrier sheet positioned atop a portion of the second distribution pipe within the retention portion, wherein in use effluent reaching the downstream portion of the second chamber can seep into the second distribution pipe and thence into soil beneath the second chamber.

6. The passive drain field assembly recited in claim 1, wherein the barrier sheet extends to a position adjacent the berm top.

7. A method of treating wastewater effluent comprising:

channeling wastewater desired to be treated to a first chamber having positioned therein a subterranean bundle of pipes comprising a distribution pipe in fluid communication with the inlet, the distribution pipe having a plurality of apertures therethrough and a plurality of void pipes positioned lower than the distribution pipe, the void pipes each having a plurality of apertures therein, the pipe bundle slightly sloping toward an outlet; and venting an interior of the first chamber to an atmosphere above the pipe bundle, wherein ammonia in the effluent is at least partially converted to a nitrate in the presence of oxygen supplied via the venting;

channeling effluent exiting the first chamber to a retention portion of a second chamber positioned at least partially beneath the first chamber, the second chamber having a reactive carbon-source medium positioned therewithin, the retention portion defined by an elevated berm positioned in spaced relation from the second chamber inlet and a downstream end, and having a top in spaced relation from a top of the second chamber;

permitting effluent to remain in the retention portion until the effluent reaches a level higher than the berm top, wherein the nitrate is converted to nitrogen gas and is placed in contact with the reactive medium;

permitting effluent to flow over the berm top to a portion of the second chamber downstream of the berm;

permitting the effluent to continue contacting the reactive medium; and permitting the effluent in the downstream portion of the second chamber to seeping into soil beneath the second chamber through the perforated bottom.

8. The method recited in claim 7, wherein the wastewater channeling step comprises channeling wastewater from a septic tank having an outlet in spaced relation from a bottom of the septic tank.

9. The method recited in claim 7, wherein the step of channeling effluent from the first chamber comprises using a substantially vertical pipe providing fluid communication between the pipe bundle outlet and the second chamber inlet.

10. The method recited in claim 7, wherein the reactive carbon-source medium comprises recycled vehicle tire material.

11. The method recited in claim 7, wherein the second chamber bottom comprises a second distribution pipe, the second distribution pipe having a plurality of apertures therethough, the barrier sheet positioned atop a portion of the second distribution pipe within the retention portion, and wherein the step of permitting effluent to seep into the soil comprises permitting the effluent to escape from second distribution pipe apertures and thence into soil beneath the second chamber.

12. The method recited in claim 7, wherein the barrier sheet extends to a position adjacent the berm top.

\* \* \* \* \*